Nov. 4, 1958

F. C. FAHNESTOCK ET AL 2,859,171

HYDROCARBON CONVERSION PROCESS

Filed Jan. 31, 1952

INVENTORS
Frank C. Fahnestock
James P. Shambaugh
BY
John A. Crowley, Jr.
ATTORNEY

United States Patent Office 2,859,171
Patented Nov. 4, 1958

2,859,171

HYDROCARBON CONVERSION PROCESS

Frank C. Fahnestock, Manhasset, and James P. Shambaugh, Huntington, N. Y., assignors to Socony Mobil Oil Company, Inc., a corporation of New York Application January 31, 1952, Serial No. 269,193

17 Claims. (Cl. 208—86)

This invention relates to the conversion of high-boiling liquid hydrocarbons or mixed phase hydrocarbons to lower-boiling hydrocarbons in the presence of a moving, particle-form contact mass material which may or may not catalytically influence the conversion. It is more particularly concerned with a method of charging high-boiling hydrocarbon charge stocks to a conversion zone.

One aspect of this invention deals with a novel and useful method for effecting initial uniform contact and mixing between a reactant initially available as a liquid and a finely divided contact material with which the reactant is to be contacted. In this connection the invention is not restricted to charges which are thermally unstable when vaporized under pressures desirable for the contacting. Thus for example, the charge may be a petroleum gas oil or naphtha fraction.

In another aspect, this invention deals with a method for introduction of reactant charges into a contact-type conversion zone operated under superatmospheric pressures and at elevated temperatures which reactant charges are comprised either wholly or partially of constituents which undergo pyrolytic decomposition or reaction when vaporized under the pressure conditions desirable for effecting their conversion in the presence of the finely divided solid contact materials. One aspect of the invention is particularly concerned with a method for conversion of high boiling liquid hydrocarbon charges in the presence of finely divided catalysts and for effecting uniform and intimate initial contact between the catalyst and the contact material. In this connection the invention deals particularly with hydrocarbon feeds which are wholly or partially subject to pyrolytic decomposition when vaporized under the pressure conditions most desirable for their catalytic conversion. Examples of the process reactions to which this invention may be applied in some or all of its aspects are thermal cracking, coking, viscosity breaking, reforming, polymerization and catalytic cracking, hydrogenation, reforming, dehydrogenation, isomerization, viscosity breaking, aromatization, cyclizing, polymerization, alkylation and other reactions.

Methods have been proposed for conducting thermal, non-catalytic operations in the presence of non-catalytic heat carriers, such as spheres or particles of metals, stones, or refractory materials, e. g., mullite, zirkite, or corhart materials. Catalytic cracking, on the other hand, is effected at temperatures in the order of about 800° F. and higher, in the presence of suitable absorbent type catalysts. Such catalysts can be natural or treated clays; bauxite; inert carriers on which catalytic materials, such as metal oxides, have been deposited; or certain synthetic associations of metallic compounds, for example, silica, alumina, silica and alumina, to which small amounts of other materials, such as metal oxides, can be added for special purposes. When the operation involves catalytic reforming, aromatization, hydrogenation, etc., catalysts usually recommended for such processes may be used.

The contact material particle size may vary widely, depending upon the type of conversion system involved. For systems in which the contact material is passed through the conversion zone as a compact bed or column of granular material, i. e., material of palpable particulate form, such as spheres, pellets, tablets, or particles of irregular shape, the particle size will vary from about 0.05 to about 0.5 inch average diameter. For catalytic cracking, reforming, etc., the particle size preferably is within the range of between about 3 and about 20 mesh, by Tyler screen analysis. On the other hand, in systems in which the contact material is maintained in a so-called fluidized stage, powdered material of less than 100 mesh, and preferably less than 200 mesh, Tyler, is preferred. The term, "finely divided," as employed herein is intended to cover both powdered solids and solids of palpable particulate form.

Throughout the specification and the claims, terms, such as "contact material," "contact mass," and "contact mass material," refer to contact materials broadly, whether they are catalytic or non-catalytic, and adsorbent or non-adsorbent, with respect to the process involved, unless specifically stated otherwise. Likewise, the term, "conversion," is applied to catalytic or non-catalytic operations in which the aforementioned contact materials are utilized to change the physical and chemical characteristics of charge stocks. The term, "gaseous phase," and similar terms, refer to material which is in the gaseous state under the particular conditions of operation involved, regardless of the normal phase under ordinary conditions of temperature and pressure.

Two important problems which have been encountered in the use of higher-boiling materials as charging stocks in moving contact mass conversion systems are excessive coke deposits and difficulty in attaining uniform mixing of the charge with the contact material. As is well known, many hydrocarbon fractions, particularly crude petroleum stocks, contain heavy residual materials, including tars, asphalts, and catalyst poisoning metallic compounds, which cause prohibitive coke deposition on the catalyst or the solid heat-carrying material. The metallic salts from these crudes tend to poison cracking catalysts and the like. It is, therefore, desirable to remove these residual materials from the charge prior to its contact with the solid contact material. A preferable method for accomplishing this separation is by means of distillation. Because of the thermal instability of the high-boiling hydrocarbons at the temperatures required for effecting their vaporization, it has been found desirable to conduct the distillation under reduced pressure, to condense the recovered overhead vapors, and to charge the same to the conversion zone in the liquid phase. An improved method for conducting such operations is described in an application of S. D. Dalton, Serial Number 201,023, now U. S. Patent No. 2,592,404, filed in the United States Patent Office on December 15, 1950.

Another problem is that of effecting uniform initial mixing of the liquid reactant and the contact material so that uniform conversion and utilization of the contact mass is attained. In systems for the catalytic cracking conversion of high boiling liquid petroleum feeds, for example, unless uniform initial contacting is effected non-uniform conversion and non-uniform coke deposition on the catalyst results. Also, heretofore, because of the thermal instability of some of the higher boiling fractions of the petroleum crudes at temperatures required to vaporize the same at desirable conversion pressures, it has been necessary to resort to costly separate deasphalting and vacuum distillation operations to make such materials practically available as cracking stocks.

It has long been recognized that properly designed contact mass systems for effecting conversion of initially vapor phase reactant feeds offer advantages of excellent uniformity of initial contacting between the reactant and contact material without difficulties of coke deposition in the region of mixing. The present invention permits the attainment of the advantages inherent in systems employing vapor phase feeds now in operations involving feeds which heretofore have been employed only in the liquid phase.

It is a specific object of the present invention to provide a process wherein such high boiling reactants, which are unstable at the temperatures required to effect their vaporization under the pressures desirable for effecting their conversion, can be brought into contact with solid contact material, in the vapor phase.

A major object of this invention is the provision in a process wherein an initially liquid reactant is contacted with a particle-form contact material for the purpose of effecting chemical conversion, of an improved method for effecting vaporization and initial uniform mixing of the liquid reactant with the contact material.

A further major object is the provision of a method for effecting conversion in the presence of a particle-form contact material, usually catalytic in nature, of liquid reactants which are thermally unstable when vaporized under pressure conditions desirable for effecting the conversion thereof.

A further object is the provision of an improved method for charging high-boiling petroleum fractions to contact mass conversion zones.

Another object is the provision of an improved method of removing undesirable residual materials from high-boiling hydrocarbon stocks and of bringing the remainder into contact with a moving particle-form contact material.

A further object is the provision of an improved method for separating hydrocarbon fractions suitable for use as catalytic conversion stocks from residual carbonaceous and metallic compounds by vacuum distillation.

Another object is to provide a method whereby a high-boiling, thermally unstable charge stock is uniformly distributed throughout a particle-form contact mass.

These and other objects and advantages of this invention will become apparent from the following description of the invention.

In one form, the present invention involves a method wherein a high-boiling reactant charge, which is thermally decomposable when vaporized under the pressure conditions desired for effecting its conversion, is vaporized at pressures substantially below those required for its conversion, brought into initial contact with a particle-form contact material at those pressures, and then subjected together with the contact material to conversion at the substantially higher desirable conversion pressures, usually with some increase in temperature.

In a more detailed form, this invention involves the method including the steps of heating a vaporizable reactant charge, having a wide boiling range, to a temperature whereby at least a substantial portion thereof is vaporized; passing this heated charge into a vapor separation zone operated under pressures below those used for the conversion; separating a gaseous portion from the liquid portion therein; passing contact material, which has been cooled to a temperature below that of the gaseous portion, downwardly through a barometric condensation zone; contacting the gaseous portion with the cooled contact material in the barometric condensation zone, thereby condensing the gases and sorbing them on the cool contact material therein, whereby the reduced pressure is maintained in the vapor separation zone; withdrawing the contact material with the condensed gases sorbed thereon from said condensation zone into a higher pressure region without permitting substantial gas passage from said higher pressure region to said condensing zone; and heating said contact material to effect conversion of the hydrocarbon material.

Another aspect of the present invention comprises heating a high-boiling liquid hydrocarbon charge stock to a suitable temperature for effecting partial vaporization thereof; separating the vaporized portion of the charge, passing the vaporized portion into a conversion zone, as the vaporized feed; subjecting the liquid phase portion to vacuum distillation conditions, in a vacuum distillation zone, under conditions of temperature and pressure conducive of vaporization of a further non-asphaltic portion thereof without pyrolytic decomposition, cooling a portion of the contact material to a temperature below conversion-supporting temperatures; passing the cooled contact material downwardly through a barometric condensation zone; contacting the vapors from the vacuum distillation zone with the cooled contact material in the barometric condensation zone, thereby condensing the vacuum distillate vapors and sorbing them on the cool contact material therein so as to draw a vacuum on the vacuum distillation zone; and passing the contact material with the vacuum distillate sorbed thereon into the conversion zone, in admixture with additional hot contact material in an amount sufficient to sustain conversion temperatures.

Figure 1:
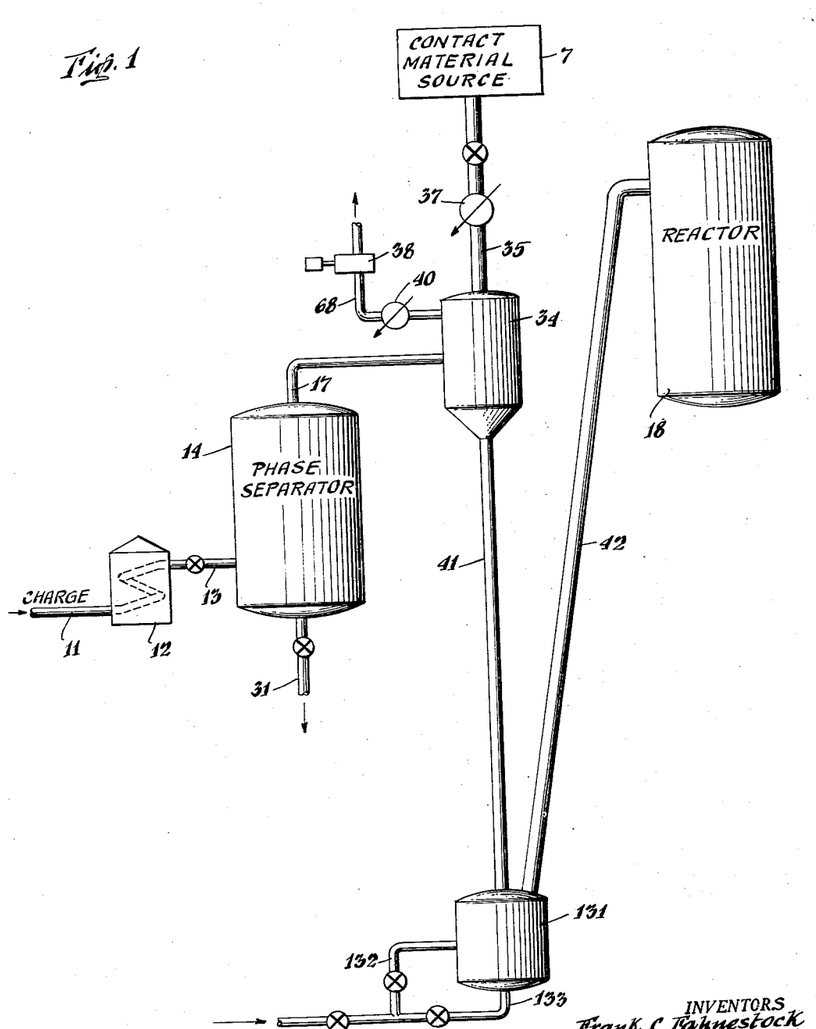
Figure 1 is a diagrammatic representation of the method of the present invention in its broad concept.

Referring now to Figure 1, a high-boiling liquid charge stock, e. g., crude petroleum or a broad cut thereof, is charged via pipe 11 through a furnace 12, or other suitable heating means, wherein the charge stock is heated to a suitable temperature. The temperature used is sufficient to vaporize a portion of the charge stock, but it is insufficient to cause substantial cracking or coking thereof.

The heated charge stock is passed through pipe 13 into a phase separator 14. The phase separator is operated under reduced pressures. Within the phase separator 14, the portion of the charge which is in the gaseous state at the selected temperature is separated from the liquid phase. This gaseous portion is passed upwardly into pipe 17, and through it into a mixer 34, which can be a low-pressure reactor or a barometric condenser. Contact material, taken from any suitable source 7, such as a regenerator, a storage hopper, or even a contact material feed leg, is passed via conduit 35 into the barometric condenser 34. As the contact material passes through the conduit 35, it is heat exchanged by means of a heat exchanger 37, in order to adjust its temperature below conversion temperatures and below the condensation temperature of the gaseous portion from the separator. This relatively cool contact material is passed downwardly through the barometric condenser 34, wherein the hot vapors supplied via pipe 17 contact the cooler contact material in the condensation zone of the condenser. They are condensed to the liquid state and are sorbed on the contact material. Due to the resultant decrease in gaseous volume, a vacuum is drawn on the phase separator 14. A small vacuum pump 38, or an ejector, may be provided to remove non-condensible gas from the system.

The contact material, with the condensed gaseous portion of the charge sorbed thereon, is passed downwardly through a barometric leg 41 into a lift feed tank 131.

A suitable lift gas is introduced via pipes 132 and 133 to lift the contact material via conduit 42 to a reactor 18 wherein conversion is effected. The necessary heat for conversion may be supplied to the contact material before it is charged to the reactor, or the contact material may be heated in the reactor, as by adding hot contact material or hot gases thereto, or by passing a heating fluid in indirect heat transfer relationship therewith.

The liquid portion from the phase separator 14 is withdrawn via pipe 31. This portion may be discarded from the system or it may be subjected to further fractionation operations, as is described hereinafter.

It will be understood that the foregoing description is general. The operations are adaptable to conversion systems employing granular catalysts as compact moving beds and to those employing powdered catalyst in suspended condition. In fluidized bed operation, the contact material may be maintained in aerated condition by introducing gases into the leg 41, as exemplified by pipes 44, 45 and 46 in Figure 2. If desired, elevators or other suitable means may be employed to effect the transfer of the mixed contact material and condensed oil to the reactor.

Figure 2:
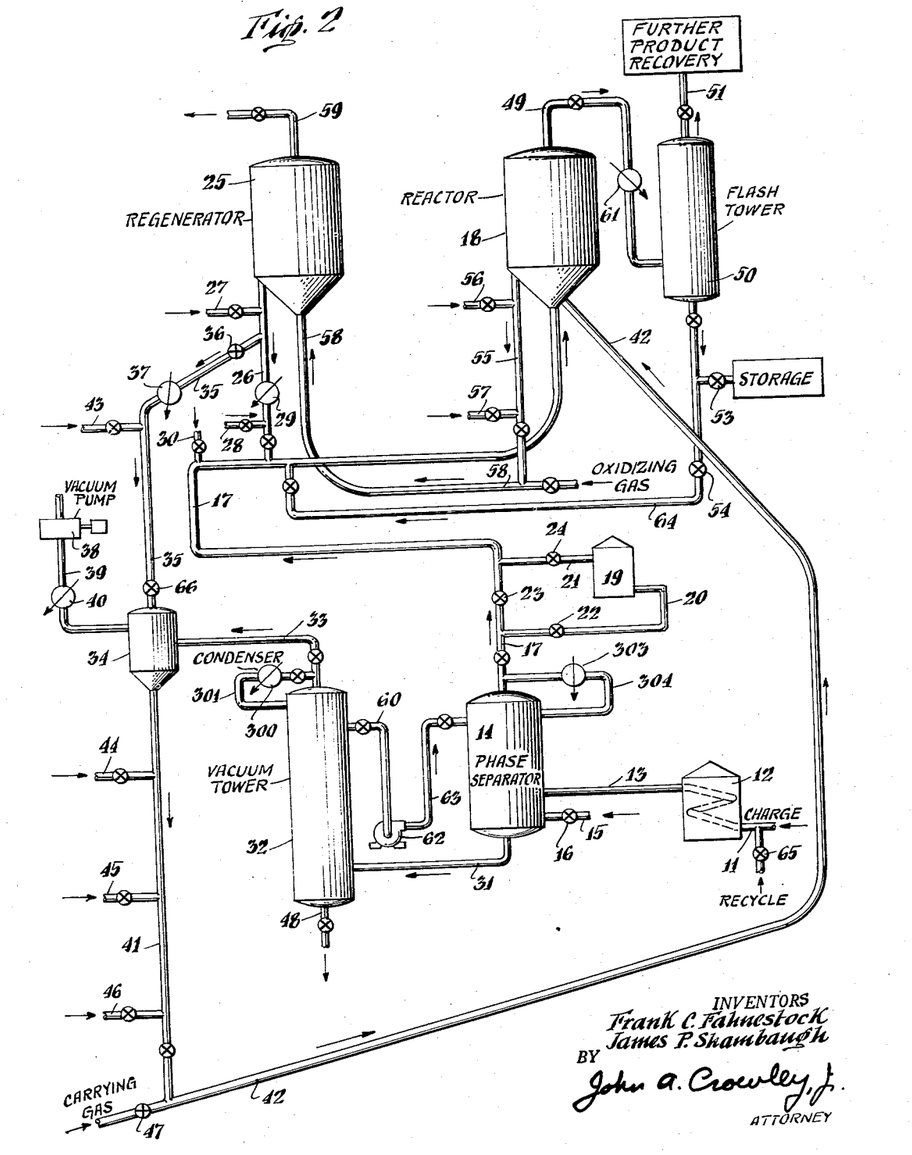
Figure 2 is a diagrammatic representation of the method of the present invention embodied in a process for conversion in the presence of a fluidized mass of contact material.

Referring now to Figure 2, there is shown a system adapted for operation with a powdered fluidized catalyst. A high-boiling liquid hydrocarbon charge stock, such as crude petroleum which may contain asphaltic constituents, is charged by means of a pipe 11 through a furnace 12, or other suitable heating means, wherein the charge stock is heated to a temperature sufficient to effect vaporization of a portion of the charge stock, but insufficient to cause substantial coking or cracking thereof. Obviously, this temperature will be dependent on the charge stock used.

The heated charge stock is passed through pipe 13, into a phase separator 14 wherein the vaporized portion is separated from the remainder of the charge stock under a pressure suitable for forcing the vaporized portion into the catalytic reactor, for example 10–30 pounds per square inch gauge. If desired, in order to increase the proportion of the stock removed as vapor, steam may be introduced into the phase separator 14 through pipe 15. The amount of steam introduced may be regulated by means of valve 16. The vaporized portion of the charge stock passes into a pipe or lift conduit 17 leading to a reactor or converter 18. If necessary, the vaporized feed may be further heated by by-passing the entire feed or a portion of it through a furnace 19, or other heating means, via pipes 20 and 21, through suitable manipulation of valves 22, 23 and 24. If desired a condenser 303 and return line 304 may be provided for refluxing a portion of the overhead in tower 14.

Powdered, solid contact material passes from the regenerator 25 down a standpipe 26 into the lift conduit 17. The contact material may range in particle size of between about 100 and about 400 standard mesh or even finer. It is maintained in a fluidized state in the standpipe 26, by means of a suitable fluidizing gas (steam, flue gas, etc.) introduced via pipes 27 and 28. In passing down the standpipe 26, the contact material is brought to the desired contact temperature, by means of a suitable heat exchanger 29 located along the standpipe 26. The powdered contact material is suspended in the phase separator overhead vapors in pipe 17 and carried thereby into the reactor 18. If desired, additional lift gas or vapor, such as for example, steam, flue gas, gaseous hydrocarbons, etc., may be supplied into conduit 17 via pipe 30.

The liquid portion of the charge stock from the phase separator 14, still at an elevated temperature, is passed through pipe 31, into a vacuum distillation tower 32, wherein an asphalt free vacuum distillate is formed under the reduced pressure. If desired, the liquid bottoms from the phase separator may be further heated prior to flashing in the vacuum tower 32. Several fractionation plates may be provided in the upper section of tower 32. The hydrocarbon vapors from tower 32 are in part condensed in condenser 300 and refluxed to the vacuum tower via pipe 301. The remainder of the vacuum tower overhead vapors pass via pipe 33 to the barometric condenser 34. A portion of the contact material from the standpipe 26 from any suitable source is passed to the barometric condenser via pipe 35. The contact material is cooled in cooler 37 to a temperature substantially below the condensation temperature of the vacuum tower overhead vapors and also below the desired catalytic conversion temperature. A seal and aeration gas may be introduced into the feed leg 35 via pipe 43. If desired, a gas tight forced feed device 66 may be provided for supplying catalyst into the condenser 34. In the barometric condenser, the hot vacuum distillate gases are condensed. They are condensed to the liquid state and are sorbed on the contact material. As a result of the decreased gaseous volume due to condensation, a vacuum is created in the barometric condenser 34 which pulls a vacuum in the vacuum tower 32. A small vacuum pump 38, or other vacuum producing means, such as a steam ejector, connected, via pipe 39, to the condenser 34, in order to remove non-condensable gases therefrom. This pump may be protected by an after condenser and separator indicated at 40. The contact material, with the vacuum distillate sorbed thereon, is passed downwardly through a barometric leg 41 into a lift conduit 42. The contact material may be maintained in fluidized condition in the leg or standpipe 41 by means of aeration gas supplied via pipes 44, 45 and 46. The addition of gas at these points is not in all cases necessary. A suitable carrying gas is introduced into the lift conduit 42 controlled by valve 47, to carry the contact material having the vacuum distillate sorbed thereon through the lift conduit into the bottom of the reactor 18. The lift gas may be steam, normally gaseous hydrocarbons or vaporized hydrocarbon feed. If desired, vapors from pipe 17 may be employed as the lift fluid in pipe 42.

The vacuum distillation is carried out at conditions of temperature and pressure such that a residual material having a soft point of between about 60° F. and about 200° F., by the ASTM Test D36–26, is obtained. In preferred operations where an asphalt product is desired, a residual material having a soft point of between about 80° F. and about 90° F. is obtained. When a number 6 fuel oil product is desired, the soft point should be of the order of 120 to 140° F. Dependent upon the particular crude charge involved, these results are obtained by operating within the ranges of temperature and pressure described hereinafter. As will be apparent to those skilled in the art, the residual material or pitch, thus achieved, is much heavier than the heavy fuel oil fractions ordinarily obtained as the bottoms from a pressure operated tar separator, thus making available for conversion a greater proportion of the original charge stock. The residual materials, including any tars, asphalt, salts, and the like, present in the original charge are removed from the bottom of the vacuum tower 32 via pipe 48. These residual materials can be removed to storage. If it is desirable to utilize the residuals as fuel oils, they can be cut back with suitable cracked fuel oil fractions, such as those derived from the conversion operations. Suitably, the residuals can be cut back to a viscosity within the range of No. 6 fuel oil as specified in ASTM D396–18T, namely 45–300 seconds Saybolt Furol viscosity at 122° F. The cracked cycle stocks have a considerably better viscosity cutting stock value than straight-run fuel oils of the same boiling range. As a result, a lower volume of cutting stock is required to meet given viscosity specifications, than when straight-run cutting stocks are used. This differential in cutting stock can be used as additional cracking stock.

In order to improve the overall efficiency of separation within the phase separator 14, it will be found advantageous, in some instances, to resort to recycling to the tower 14, a portion of the liquid from an intermediate tray along the vacuum tower 32 through pipe 63, by means of a pump 62.

The contact material, carrying gases, and hydrocarbon fractions, which are introduced into the reactor 18 via lift conduits 17 and 42, are commingled and caused to flow upwardly in the reactor, preferably in the fluidized state. Conversion of the hydrocarbons is effected during such flow. When the contact material circulated from the regenerator via pipe 17 is relied upon for supplying the heat of reaction and hydrocarbon vaporization, and other sensible heat requirements in the reactor, the relative rates of flow of the streams entering the reactor via pipes 17 and 42 must be carefully controlled to provide the desired average conversion temperature. It will be apparent that the contact material stream entering the pipe 17 from standpipe 26 is substantially above the average desired conversion temperature.

Near the top of the reactor 18, the contact material is disengaged from the carrying gases and the hydrocarbon conversion products. These gases and conversion products are passed via pipe 49 into a synthetic crude tower 50. Heat may be extracted from the stream by means of cooler 61. The gases from the flash tower are transferred to further product recovery operations via pipe 51. The bottoms from the tower 50 are drawn off via pipe 52. By suitable manipulation of the valves 53 and 54, the bottoms can be passed into storage; or all, or a portion thereof, can be recycled into conduit 17 via pipe 64 to undergo further conversion. In addition, part of this cycle oil can be used to cut back the bottom product from vacuum tower 32.

The contact material, which is disengaged from the carrying gases and the hydrocarbon conversion products, is permitted to overflow into a standpipe 55. It is maintained in an aerated condition by means of an aerating gas introduced via pipes 56 and 57. The aerated mass of contact material flows downwardly through the standpipe 55 into a lift conduit 58. An oxidizing gas is introduced into the lift conduit 58 to carry the contact material therethrough into the bottom of the regenerator 25. The contact material is usually maintained as a fluidized bed in the regenerator. Near the top of the regenerator 25, the combustion gases are disengaged from the contact material, and they are removed via pipe 59. The disengaged contact material, now regenerated, flows into the standpipe 26 to repeat the cycles described hereinbefore.

As will be apparent to those skilled in the art, the arrangement described hereinbefore may be modified in a number of ways without departing from the spirit of this invention. Thus, for example, cyclone separators may be installed in the effluent lines from the regenerator and from the reactor, in order to ensure complete separation of the fine contact material from the effluent gases.

Figure 3:
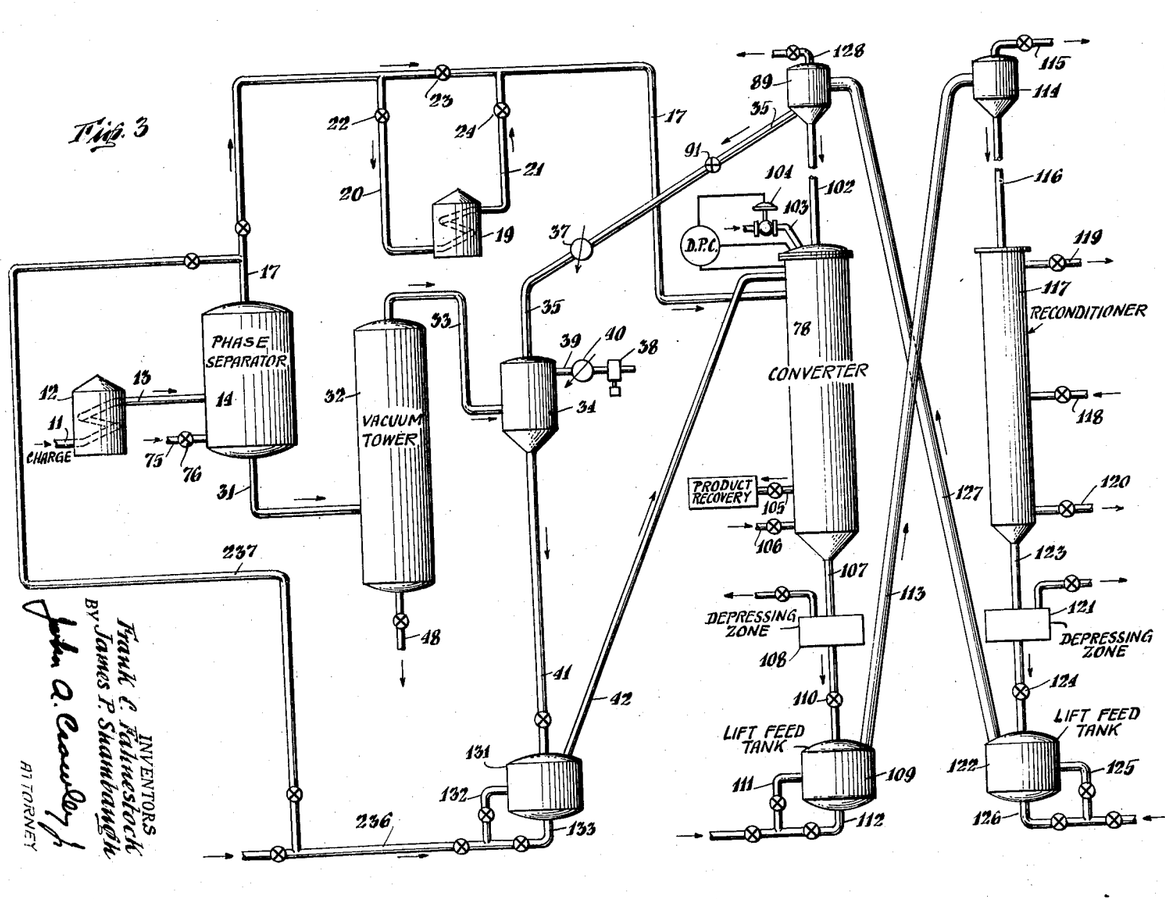
Figure 3 is a diagrammatic representation of the invention embodied in a process for conversion in the presence of a downwardly-moving bed of contact material.

The invention may be employed in conversion systems employing contact material in palpable particulate form as well as powdered contact materials. Such an arrangement is shown in Figure 3, wherein like elements bear the same numerals as in Figure 2. In the embodiment shown in Figure 3, the vaporized overhead material from the phase separator 14 is conducted via conduit 17 to a reactor 18 containing a compact bed of gravitating contact material of palpable particulate form. The phase separator is operated at a pressure somewhat above that in the catalytic reactor 78 so that the overhead vapors may flow without further compression through the reactor and the product recovery system communicating the reactor outlet. Thus, for example, the reactor may be operated at 15 pounds per square inch gauge and the phase separator at 20–25 pounds per square inch gauge. If required, the gaseous feed may be further heated by passing all, or a portion thereof, through a heating means 19 via pipes 20 and 21, through suitable manipulation of the valves 22, 23 and 24.

Substantially as described for Figure 2, the liquid bottoms from the phase separator 14 are passed through pipe 31 into a vacuum tower 32, to be subjected to vacuum distillation conditions. If desired, heat can be added to the bottoms as they pass through the pipe 31. The gaseous vacuum distillate is conducted from the vacuum tower 32, via pipe 33, into the condensation zone of a barometric condenser 34. Hot contact material of palpable particulate form is passed from a storage hopper 89 into a conduit 35, the flow being controlled by a valve 91. This contact material is cooled to a temperature below conversion temperature and below the vacuum tower overhead vapor condensation temperature, usually about 400 to 500° F., by means of a suitable cooling means 37, e. g., a heat exchanger located along the conduit 35. The cooled contact material is then passed through the barometric condenser 34, wherein it comes in contact with the hot vacuum distillate gases. As a result, the gaseous distillate condenses to the liquid state and, in that state, is sorbed on the contact material. The decrease in volume effected by condensing the gases maintains the desired vacuum in the vacuum tower 32. The contact material, with the vacuum distillate sorbed thereon, is passed downwardly through the gravity leg 41 as a compact column of gravitating particles. The leg 41 serves as a seal to prevent substantial gas flow from the lift feed zone 131 to the chamber 34. A suitable lift gas, e. g., steam, flue gas, gaseous hydrocarbons, etc., is introduced via pipes 132 and 133 to carry the contact material with the vacuum distillate sorbed thereon through a lift conduit 42 into the converter 18. If desired, all or a portion of the vapor overhead from the phase separator 14 may be passed into manifold 236 via pipe 237 to serve as the lift gas. This vapor may comprise a gas oil, kerosene, virgin gasoline-gas oil cut etc. depending upon the original charge to the phase separator. If desired, the phase separator overhead vapors may be further heated in furnace 17 prior to use as lift gas.

As has been discussed hereinbefore, the vacuum distillation is carried out under conditions of temperature and pressure to achieve a residual material having a soft point of between about 60° F. and about 200° F. This residual is removed, via pipe 48 to storage or for other uses.

In the conversion system shown in Figure 3, granular contact material, at somewhat higher than conversion-supporting temperatures, is supplied from a hopper 89 via gravity feed leg 102 into the top of the converter 78. In the upper portion of the converter 78, this contact material is admixed (by any suitable means) with the cooler contact material having the liquid feed sorbed thereon which is supplied via conduit 42. The hot contact material may be supplied via the feed leg 102 in a sufficient amount to provide a mixture existing at the desired conversion-supporting temperature. The resultant mixture is delivered upon the surface of a downwardly-moving, substantially compact bed of contact material which partially fills the converter 78. The vapor feed, from pipe 17, is charged to the converter at a point above the surface of the bed of contact material, or, optionally, directly to the bed itself. Hydrocarbons are prevented from escaping from the converter 78, by means of an inert seal gas, suitably flue gas or steam, supplied via pipe 103. The flow of seal gas through pipe 103 is regulated by a diaphragm valve 104 so controlled by means of a differential pressure controller as to maintain an inert gas pressure adjacent to the lower end of contact material feed leg 102 which is higher than the gaseous pressure in the hydrocarbon conversion zone. Converted hydrocarbons, which may contain substantial percentages of aviation and motor gasolines, and fuel oils, are removed, in the gaseous phase, from the converter 78 through pipe 105. These hydrocarbons are then passed to suitable product recovery operations. In order to prevent escape of the hydrocarbon products with the contact material, an inert purge gas, such as steam or flue gas, may be introduced into the converter 78 via pipe 106.

Used contact material flows downwardly from the converter 78 via conduit 107 through a depressuring zone 108 into a lift feed tank 109. An inert lift gas, suitably steam or flue gas, is introduced into the lift feed tank 109, via pipes 111 and 112, so as to lift the contact material from the lift feed tank, in gaseous suspension, through a conduit 113 into a hopper 114. The rate of contact material withdrawal from the reactor is controlled by the rate of catalyst transfer through the lift. The lift gas is separated from the contact material in the hopper 114 and exhausted via pipe 115. Then, the contact material passes downwardly through a gravity feed leg 116 into a reconditioner 117. In processes such as catalytic cracking conversion of hydrocarbons, there usually is a considerable lay-down of coke deposits on the contact material. In such a case, the reconditioner 117 takes the form of a regenerator, wherein oxygen or air is introduced via pipe 118 to burn off the coke deposits. The combustion gases are removed through pipes 119 and 120. In other processes, coking of the contact material will not be encountered. In such an event, the reconditioner 25 may take the form of a heater, the heating being accomplished by means of heated gases circulated in through pipe 118 and out through pipes 119 and 120.

Reconditioned and/or heated contact material flows from the bottom of the reconditioner 117 through a depressuring zone 121 into a lift feed tank 122 via conduit 123; the rate of flow being controlled by valve 124. Suitable inert lift gases are introduced through pipes 125 and 126 into the lift feed tank 122, thereby lifting the reconditioned contact material, in gaseous suspension, through conduit 127, into the hopper 89. The contact material is disengaged from the lift gas therein, which gas is exhausted via pipe 128. The contact material then flows downwardly into the gravity feed leg 102 and repeats the aforedescribed cycle, or a portion is passed into the conduit 35, as described hereinbefore.

It must be strictly understood that this invention is not limited to the precise conversion system as illustrated in Figure 3. Other modifications of this system, well known to the art, are contemplated. For example, the contact material may be lifted through conduits 113 and 127 and 42 by other conveyor means, which are adapted to carry hot solid particles. Likewise, the reactant feed may be caused to flow upwardly through the reaction zone instead of downwardly with the contact material as shown.

Figure 4:
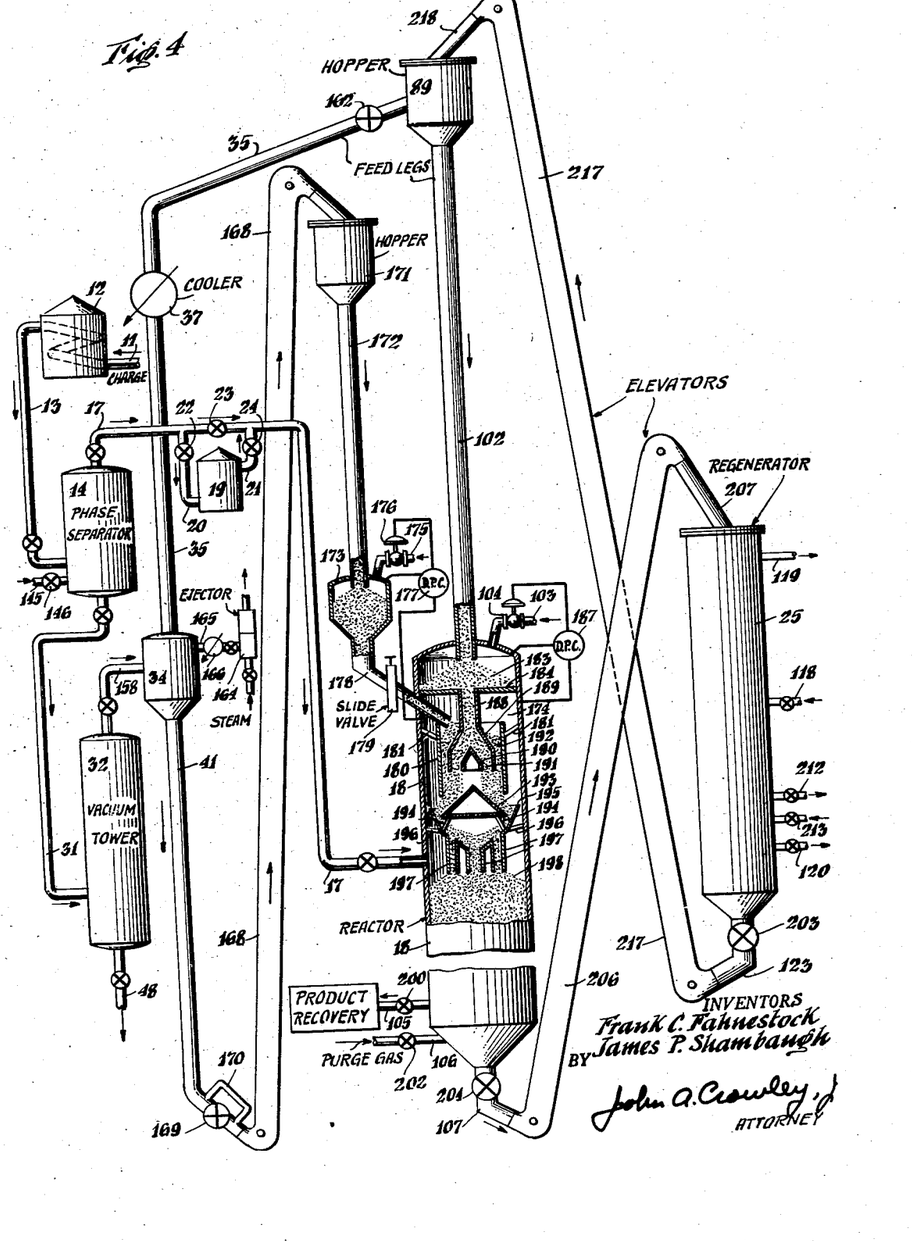
Figure 4 is a diagrammatic representation of the invention in another embodiment of a process for conversion in the presence of a downwardly-moving bed of contact material.

Another modification of the process of this invention is shown in Figure 4, in which like numerals are given to elements similar to those in Figures 2 and 3. In the arrangement shown in Figure 4, the vaporized gas oil overhead from the phase separator 14 is passed via pipe 17 into the reactor. This overhead enters the reactor above the surface level of the bed 198 therein. The solid material bearing sorbed hydrocarbons from the barometric condenser 34 pass from the gravity seal leg 41, at a rate controlled by valve 169, into a bucket elevator 168. A by-pass 170 is provided around the valve 169 to eliminate pressure differentials across the valve. The mixture is delivered by the elevator 168 into hopper 171. The cool contact material then falls downwardly in a substantially compact column through a conduit 172 into a seal chamber 173. A gaseous pressure slightly above that in zone 174 of the reactor 148 is maintained in the seal chamber 173 by introduction therein of a suitable inert seal gas (e. g., steam, nitrogen, flue gas, etc.) via pipe 175 at a rate controlled by diaphragm valve 176 and differential pressure control instrument 177. The cool contact material passes from the seal chamber 173 via conduit 178, and at a suitable rate controlled by a slide valve 179, into the upper section of a curtained zone defined by a cylindrical curtain 180, supported within the upper region of the reactor by a plurality of rods 181.

Hot contact material is fed from the hopper 89 via a feed leg 102 into a seal zone 183 of the reactor 18. This seal zone is defined by a partition 184 supported across the upper section of the reactor. The pressure in this seal zone is maintained slightly above that in zone 174 by the introduction of a suitable inert seal gas via pipe 103, at a rate controlled by a diaphragm valve 104 and the differential pressure control instrument 187. Then the hot contact material passes via conduit 188, depended centrally from partition 184, into a curtain 189. This curtain, of substantially less cross-sectional area than the skirt 180, extends downwardly from the lower end of the conduit 188 and terminates short of the lower end of skirt 180. A cylindrical baffle 190 having a conical shaped roof is supported directly below the opening of the conduit 188. This baffle is of smaller diameter than the curtain 189, so as to leave an annular passage 191 therebetween. Another annular passage 192 is defined by the curtains 180 and 189.

The hot contact material stream from conduit 188 is caused to mix with the stream of cool contact material from conduit 178 by means of the curtain 189 and baffle 190 working together with the cylindrical curtain 180 which directs the mixed contact material onto a conical baffle 193 supported by rods 194 at a level substantially below the lower extremities of members 189 and 190. A basin 195, of less diameter than the reactor 18 but of greater diameter than the base of the conical baffle 193, is supported by rods 196 below the baffle 193 so as to receive the contact material flow therefrom. The relative height of the sides of the basin 195 and the lower extremity of the curtain 180 are fixed in a relationship to prevent mixed contact material from overflowing the basin. The contact material, now mixed so as to achieve the desired conversion temperature, is passed downwardly through a plurality of uniformly spaced conduits 197 onto the surface 198 of a substantially compact, downwardly moving bed of contact material, wherein conversion takes place. The above-described method utilizable for mixing the cool contact material with hot contact material is one of several methods possible. This and other methods are described in the application of Louis P. Evans, Serial Number 776,471, now U. S. Patent No. 2,779,717, filed in the United States Patent Office on September 27, 1947.

In the lower section of the reactor 18 there is a suitable device for collecting the gaseous products, such as, for example, collecting troughs. The gaseous product is drawn off through pipe 105 to a suitable product recovery operation. The gas flow in pipe 105 is controlled by means of a valve 200. In order to prevent escape of the gaseous products with the contact material, a suitable purge gas can be introduced via pipe 106, controlled by valve 202.

The size of the conduits 197 is sufficiently large to permit contact material discharge from the basin 195 at the desired total throughput rate. The spent contact material is withdrawn from the bottom of the reactor at a controlled rate, regulated by valve 204 on conduit 107. The contact material withdrawn via conduit 107 is transferred to a regenerator 25 via a conveyor 206 and a conduit 207. The conveyor can be any type suitable for the transfer of solid contact material without excessive attrition, for example, a continuous bucket elevator or a gas lift. Then, the contact material travels downwardly, in a substantially compact column, through the regenerator 25.

In the regeneration operation illustrated, a suitable combustion supporting gas (air, oxygen, etc.) is introduced at a central level via conduit 118. Gaseous combustion products are withdrawn through conduits 119 and 120 located at opposite ends of the regenerator. Excess regeneration heat is removed by means of a cooling coil served by pipes 212 and 213. The regenerated contact material is withdrawn from the regenerator 25 via conduit 123. The rate of contact material withdrawal is controlled by valve 203. The hot, regenerated contact material is then lifted to the hopper 160, by means of a suitable conveyor 217 and a conduit 218.

Figure 5:
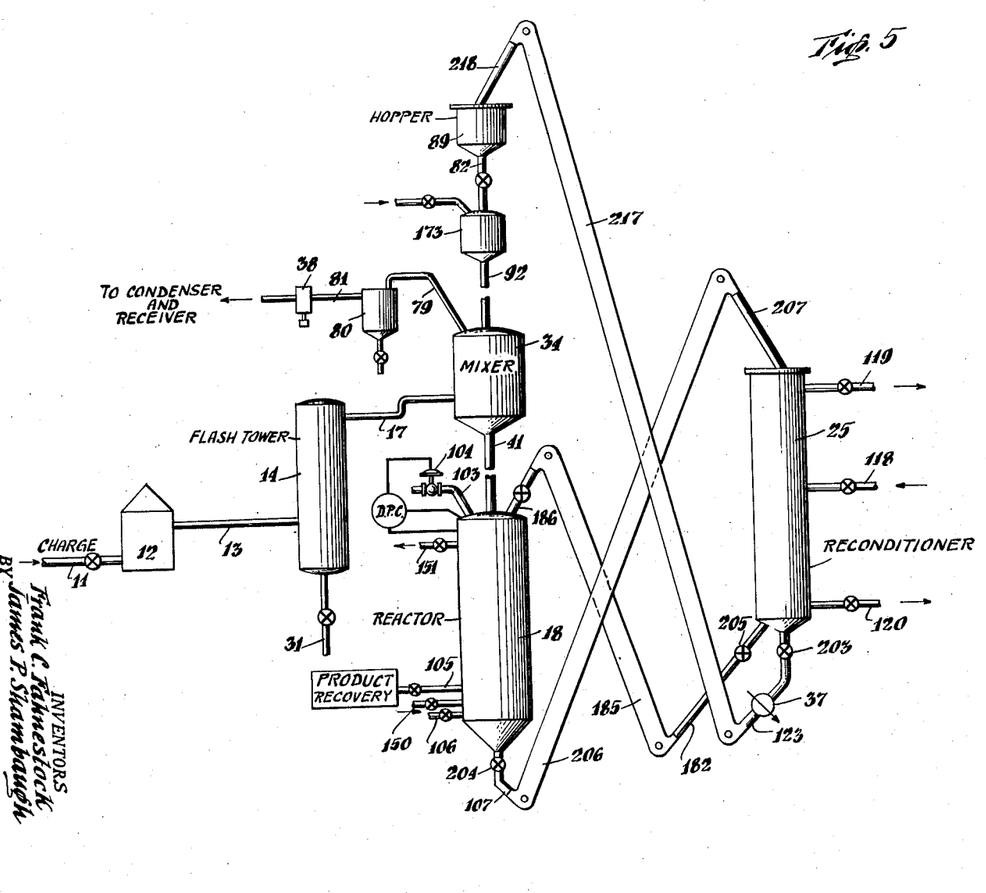
Figure 5 is a diagrammatic representation of an embodiment of the broad concept of the present invention in a process for conversion in the presence of a moving bed of contact material, wherein two reactors are in series.

Another embodiment of the present invention, as applied to systems employing granular contact materials, is shown in Figure 5, wherein like elements bear the same numerals as in the preceding figures. In this embodiment, the petroleum charge after being preheated under suitable pressure in tube heater 12 is flashed under reduced pressure, which may be below atmospheric in the flash tower 14. The vaporized overhead material is conducted via conduit 17 to the mixer 34. The mixer 34 which contains a bed of contact material is operated under a pressure lower than that in the reactor 18. The flash tower 14 is operated under substantially the same pressure as that at the vapor inlet end of the mixer 34. The pressure differential through the mixer may be very slight or it may amount to several pounds per square inch. The mixer may be operated under a vacuum, while the reactor is operated under pressure, e. g., in the order of about 15 pounds per square inch gauge. In this case, a trap 80 and a small vacuum pump 38 may be used to remove non-condensable gases from the system.

In some operations, however, the mixer 34 and flash tower 14 will be operated under slight pressure, with the reactor 18 under a greater pressure. For example, the mixer may be operated under two pounds per square inch gauge pressure, while the reactor 18 is operated under pressure in the order of 50 pounds per square inch gauge. In this case, of course, the vacuum pump 38 will not be necessary. Usually as in the case of the barometric condenser the contact material within the mixer is at a temperature substantially below the conversion temperature. In a typical catalytic cracking operation, granular contact material which has been cooled to a temperature of the order of 400–600° F. by means of a cooler 37 on leg 123 is fed from the hopper 89 into a seal zone 173 via conduit 82. Then the contact material is passed downwardly via feed leg 92 into the mixer. Depending upon the temperature of the contact material the oil feed involved, the relative catalyst to oil throughput ratio, and the operating pressure in the mixer, all or only a portion of the overhead gases from the flash tower 14 may be condensed on the contact material. Any non-condensed material is withdrawn via pipes 79 and 81 to a condenser and receiver or fractionation system. The condensed hydrocarbons and the contact material are passed via seal leg 41 into the main reactor 18, wherein the conversion is effected. The catalyst and condensed feed entering the reactor 18 are heated to a suitable conversion temperature of the order of 800–1100° F. by any of several means well known to the art. For example, additional hot contact material may be supplied to the reactor via the conveyor 185 and conduit 186 at a temperature of the order of 950–1200° F. The amount of contact material so supplied can be controlled by valve 205 on conduit 182. Heating can also be accomplished by means of heat exchange tubes within the reactor (not visible) which communicate an inlet 150 and an outlet 151 through which a suitable heat exchange fluid can be supplied and withdrawn. Such heat transfer tubes may be employed in place of hot contact material recycle for supplying heat in any of the arrangements shown in Figures 1–4. Alternatively, a superheated gas or vapor may be injected into the reactor at one or more levels to supply the required reaction heat. In the lower portion of the reactor, the cracked, lower boiling gasiform reaction products are separated from the contact material and are removed via pipe 105, substantially as described hereinbefore. If desired, any portion of the feed which may have been vaporized in mixing zone 34 and withdrawn via pipe 81 may be separately supplied into the reactor 18 to effect cracking conversion thereof. The used contact material is removed via conduit 107 and transferred to a reconditioner 25 via conveyor 206 and conduit 207. The operation of the reconditioner 25 is essentially the same as described in conjunction with Figures 3 and 4. The reconditioned contact material is withdrawn via conduits 182 and 123 the amount of contact material flow through the conduits being controlled by valves 205 and 203 respectively.

It is further contemplated that the invention in its broadest aspects may be included an operation of the system shown in Figure 5 wherein the reactant feed is subjected first to contact with the solid material at a pressure below the desired reaction pressure but at the desired conversion temperature to effect a preliminary partial conversion and lowering of its boiling range in the mixer 34 after which the partially converted reactant is subjected to further conversion at a higher pressure in the presence of the same or a different contact material. In such an operation it will often prove desirable, although not in all arrangements necessary, according to this aspect of the invention to effect a temporary separation of the vaporized portion of the reactant and contact material during transfer from mixing zone 34 to conversion zone 18. An operation of this latter type permits vaporization of high boiling constituents of the feed at pressures below the desirable conversion pressure but at a level permitting vaporization without coking or thermal decomposition. The thus vaporized material may then be partially converted at the low pressure to form material which can be vaporized at the desired reaction pressure without thermal decomposition and this material may then be completely converted in the reactor 18 at the higher and optimum conversion pressure. Thus for example, a long crude residuum may be vaporized in a flash separator at 4 pounds per square inch absolute, contacted in an initial mixing zone at 3 pounds absolute and 950° F. with a cracking catalyst to effect partial conversion to vapors which can be later treated over the same catalyst at 900° F. and 50 pounds per square inch gauge to effect final conversion to gasoline containing products.

As mentioned hereinbefore, the operating conditions selected for a conversion operation will depend upon the requirements of the process involved. Likewise, the operating conditions involved in the preparation of the feed materials will vary over a considerable range. Thus in the catalytic cracking of a long petroleum crude residuum or of a whole crude charge, the initial liquid charge will be preheated to temperatures of between about 700° F. and about 900° F., preferably between about 750° F. and about 850° F., and charged to the phase separator at those temperatures. Where the desired conversion is to be catalytic it is important not to overheat the reactant charge to the phase separator to a level where substantial pyrolytic cracking or coking would occur. The pressures within the phase separator may vary from about 10 to about 50 pounds per square inch gauge and in cases such as those discussed in connection with Figure 5, even lower pressures may be involved. The vaporized feed from the phase separator including gas oil and in some cases lighter will be at temperatures of about 600–850° F., it can be charged to the reactor or convertor at those temperatures, or further heating or cooling may be required, dependent on the type of conversion process used and on the type of feed. Usually for catalytic cracking operations, average conversion temperatures within the range about 800° F.–1100° F. are desirable in the reactor. The liquid portion of the charge stock from the phase separator is charged into the vacuum tower at temperatures of between about 600° F. and about 850° F. The vacuum tower is operated under pressures of between about one and about ten pounds per square inch, absolute, and preferably under about two pounds per square inch, absolute. The vacuum distillate vapors emerge from the vacuum tower at temperatures of between about 550° F. and about 775° F. The residual material emerges from the vacuum tower at temperatures of between about 600° F. and about 800° F. It must be strictly understood that the afore-described conditions are merely those ordinarily used. Other conditions of temperature and pressure can be used, when the nature of the materials processed require it, or admit of it.

The temperature of the cool contact material entering the barometric condenser will be not only below the conversion temperature, but also substantially lower than the boiling range of the liquid material being sorbed thereon. Ordinarily the temperature will vary between about 200° F. and about 600° F., preferably between about 300° F. and about 400° F. The temperature of the contact material with the liquid material sorbed thereon, as it emerges from the barometric condenser varies between about 300° F. and about 650° F., and preferably between about 400° F. and about 500° F. The amount of contact material supplied to the barometric condenser must be not only sufficient to effect condensation of the vapors but also sufficient to sorb the condensate without wetting or mudding of the contact material to such an extent as would interfere with flow of the material from the condensing zone. The amount of contact material required to meet this latter requirement will depend upon the sorption capacity and other characteristics of the contact material used, as those skilled in the art will readily appreciate.

In any conversion process, the pressures within the contact material storage vessel (or within the regenerator in the fluid process) are ordinarily greater than those in the barometric condenser. Accordingly, in order to prevent gases from flowing into the barometric condenser and increasing the pressure therein, the feed leg conduit leading to the barometric condenser (e. g., conduit 36 in Figure 2) must be of sufficient length and sufficiently restricted cross-section so as to provide an effective seal with the mass of contact material. The required length of conduit can be readily calculated by those skilled in the art.

Likewise, along the barometric drain leg, there will be a pressure differential ranging from the reduced pressure within the barometric condenser to about atmospheric pressure or superatmospheric pressures in the elevator or lift conduit. Thus, the length of the barometric leg must be sufficient to provide actual catalyst head, in the case of a leg of fluidized powdered material, or a calculatable contact material head, in the case of granular material, in order to overcome the pressure differential across the length of the leg. In a fluidized system, the catalyst head should be equal to the pressure differential. When a compact, granular contact material in the is used, the weight of the total contact material in the entire leg divided by the cross sectional area of the leg should substantially exceed the pressure drop across the leg. In addition, the leg should be of such restricted cross sectional area that the rate of gas flow required to maintain the fluidized leg, or the rate of gas flow forced through a compact leg by the differential pressure, is only a small fraction of the rate of vacuum distillate entry to and condensation in the barometric condensation zone at the upper end of the leg. In the processes for conversion in the presence of a compact bed of contact material, if the contact material is one of the conventional catalysts it may range in density from about 35–55 pounds per cubic foot. This will calculate to a required column length of about 4–5 feet for each pound of pressure differential. In the fluid processes, the contact material may have a flowing density of about 5–30 pounds per cubic foot. Knowing the flowing density of the contact material involved and the amount of pressure differential, the required leg length can be readily calculated by well-known methods.

As an example of the operation of the barometric condenser in a system such as that shown in Figure 3, the vacuum tower may operate at about 5 pounds per square inch absolute on a phase separator bottoms from a long crude residuum to produce 1000 barrels per day of vacuum gas oil overhead having an API gravity of 18. The gas oil vapors may enter the condensing zone at 760° F. and therein contact a bead type synthetic-silica-alumina gel cracking catalyst of about 4–20 mesh Tyler size range and about 40 pounds per cubic foot density. The catalyst enters the condensing zone through an open gravity feed leg of restricted cross section at a temperature of about 400° F. and a rate of about 39 tons per hour. The catalyst bearing sorbed condensed gas oil leaves the condensing zone through the gravity barometric leg at about 550° F. and is then transferred to a catalytic conversion zone wherein its temperature is raised to about 900° F. to effect the catalytic cracking conversion of the gas oil to a lower boiling gasoline containing product.

It is to be understood that the specific examples of the apparatus design and arrangement and of operation and application of this invention are intended only as illustrative and it is intended to cover all changes and modifications of the examples of the invention herein chosen for purposes of disclosure, which do not constitute departures from the spirit and scope of the invention.

We claim:

1. A method for effecting conversion of liquid reactants in the presence of finely divided solid contact materials which comprises, effecting vaporization of the liquid reactant in a confined vaporization zone under a substantial vacuum, passing the resulting vapors through a confined communicating passage to a confined condensing zone and admixing the vapors with the finely divided contact material supplied to said condensing zone at a temperature sufficiently low to effect condensation of at least a substantial portion of said vapors on the contact material, whereby a vacuum is maintained in said vaporization zone, transferring the contact material bearing the condensed reactant to a confined conversion zone and effecting conversion of the reactant therein at a suitable conversion temperature and at a pressure substantially higher than that in said vaporization zone.

2. A method for effecting conversion of liquid hydrocarbon reactants in the presence of finely divided solid contact materials, which comprises, effecting vaporization of the liquid hydrocarbon reactant under a reduced pressure at which the reactant is pyrolytically stable, mixing the resulting vapors with finely divided contact material supplied at a temperature substantially below the condensation temperature of said vapors to effect condensation of the reactant uniformly onto the contact material, transferring the contact material bearing the liquid reactant to a confined conversion zone and therein effecting the desired conversion under a pressure substantially above that at which said reactant could be vaporized without pyrolytic decomposition.

3. An improved method for effecting conversion, in the presence of finely divided contact material, of liquid reactants which are thermally unstable when vaporized under pressure conditions desirable for effecting the conversion thereof, which comprises vaporizing the liquid reactant at a pressure which is substantially below the desirable conversion pressure and which permits vaporization at a temperature below that at which said reactant is unstable, bringing the vaporized reactant in vaporized condition into contact with a finely divided contact material at a pressure substantially below the desirable conversion pressure, and then subjecting the mixture to substantially higher pressures and temperatures to complete the conversion of said reactant.

4. An improved method for effecting conversion, in the presence of particle-form contact material, of high-boiling hydrocarbon charges which rapidly decompose when heated to the temperature required to effect the vaporization thereof at the desired conversion pressure, which comprises, vaporizing said high-boiling hydrocarbon charge at a pressure which is sufficiently below the desired conversion pressure to permit vaporization without decomposition of said charge, bringing the charge in vaporized condition and substantially at the pressure of said vaporization into intimate contact with the particle-form contact material existing at a temperature below the vaporization temperature, whereby the vaporized charge is intimately mixed with and condensed upon said contact material, and then subjecting the contact material bearing the condensed charge to substantially higher temperature and pressure to effect the conversion of said hydrocarbon charge.

5. An improved method for effecting conversion, in the presence of particle-form contact material, of high-boiling hydrocarbon charges which rapidly decompose when heated to the temperature required to effect the vaporization thereof at the desired conversion pressure, which comprises, vaporizing said high-boiling hydrocarbon charge at a pressure which is sufficiently below the desired conversion pressure to permit vaporization without decomposition of said charge, bringing the charge in vaporized condition and substantially at the pressure of said vaporization into intimate contact with the finely divided adsorbent catalyst substantially at the pressure of vaporization and at a temperature sufficiently low to condense at least a portion of said charge, whereby the condensate is sorbed on the catalyst and then subjecting the mixture to substantially higher pressures to effect the conversion of said hydrocarbon charge.

6. An improved method for effecting conversion, in the presence of particle-form contact material, of liquid reactants which are thermally unstable when vaporized under pressure conditions desirable for effecting the conversion thereof, which comprises vaporizing the liquid reactant at a pressure which is substantially below the desirable conversion pressure and which permits vaporization at a temperature below that at which said reactant is unstable, bringing the vaporized reactant in vaporized condition into contact with a finely divided contact material at a pressure substantially below the desirable conversion pressure and at a temperature sufficient to effect partial conversion of said reactant to reactant material which would be stable in the absence of a conversion catalyst at the temperatures required to vaporize the same under the desirable conversion pressure and then subjecting the partially converted reactant in the vapor phase to conversion in the presence of a suitable conversion catalyst at the substantially higher desirable conversion pressure.

7. A method for converting liquid reactants under pressure with a finely divided solid contact material which comprises, heating a vaporizable reactant charge, having a wide boiling range, to a temperature whereby a substantial portion thereof is vaporized, passing the heated charge into a vapor separation zone operated under pressures below those used for the conversion; separating a vaporized portion from the liquid portion therein, passing a finely divided contact material which has been cooled to a temperature below the condensation temperatures of said vaporized portion downwardly through a confined condensation zone which communicates said separation zone; passing said vaporized portion into contact with the cooled contact material in the condensation zone, thereby condensing the vapors and depositing the condensate on the cool contact material therein, whereby the pressure in the vapor separation zone is maintained below that in said conversion zone, withdrawing the contact material bearing the condensate thereon from said condensation zone and transferring the contact material into a higher pressure zone without permitting gas passage from said higher pressure zone to said condensing zone; and heating said contact material in said higher pressure zone to effect conversion.

8. A method for converting the lower-boiling portion of a hydrocarbon charge having a boiling range of substantial width, which comprises heating said charge to a temperature suitable for effecting vaporization of said lower-boiling portion and passing the heated charge into a vapor separation zone maintained under vacuum, withdrawing the non-vaporized portion of said charge from said zone, passing the vaporized portion from the upper section of said separation zone into a confined condensing zone, introducing finely divided contact material into said condensing zone to mix with said vapors, said contact material existing at a temperature below the boiling range of said vaporized portion, controlling the amount of said contact material introduced to said condensing zone to effect rapid condensation of said vaporized portion and sorption of the condensate without substantial wetting of the contact material, whereby a vacuum is created in said condensing zone and drawn on said separation zone, withdrawing the contact material bearing the sorbed condensate from the lower section of said condensing zone as an elongated gravity drain leg, said leg being of sufficient length to force contact material flow by gravity from said condensing zone to a higher pressure region at the lower end of said leg and said leg being of such restricted cross-section as to limit gas flow through said leg into the condensing zone to a small fraction of the amount of said vaporized hydrocarbons entering said zone from said separation zone, and subjecting the contact material so withdrawn to heating to raise its temperature to a temperature suitable for effecting the desired conversion of said sorbed condensate.

9. A method for the conversion of high-boiling liquid hydrocarbons to lower-boiling hydrocarbons, which comprises heating a high-boiling hydrocarbon charge stock to a temperature sufficient to vaporize a portion thereof, but insufficient to cause substantial cracking or coking thereof, separating a portion which is in the gaseous phase at said temperature from a liquid portion, passing the gaseous phase portion into a conversion zone and contacting it with hot finely divided contact material to effect conversion thereof, subjecting said liquid portion to vacuum distillation conditions to produce a vacuum distillate, condensing and depositing the vacuum distillate on relatively cool, finely divided contact material in a confined condensing zone, thereby creating a vacuum, withdrawing the contact material bearing the vacuum distillate from said condensing zone into a higher pressure region without permitting substantial gas passage from said higher pressure region to said condensing zone, and heating said contact material to effect conversion of the hydrocarbon material.

10. A method for converting the lower-boiling portion of a hydrocarbon charge having a boiling range of substantial width, which comprises heating said charge to a temperature suitable for effecting vaporization of said lower-boiling portion and passing the heated charge into a vapor separation zone maintained under vacuum, withdrawing the non-vaporized portion of said charge from said zone, passing the vaporized portion from the upper section of said separation zone into a confined condensing zone, introducing finely divided contact material into said condensing zone to mix with said vapors, said contact material existing at a temperature below the boiling range of said vaporized portion, controlling the amount of said contact material introduced to said condensing zone to effect rapid condensation of said vaporized portion and sorption of the condensate without substantial wetting of the contact material, whereby a vacuum is created in said condensing zone and drawn on said separation zone, withdrawing the contact material bearing the sorbed condensate from the lower section of said condensing zone as an elongated gravity drain leg, said leg being of sufficient length to force contact material flow by gravity from said condensing zone to a higher pressure region at the lower end of said leg and said leg being of such restricted cross-section as to limit gas flow through said leg into the condensing zone to a small fraction of the amount of said vaporized hydrocarbons entering said zone from said separation zone, passing the contact material so withdrawn through a confined conversion zone in admixture with a substantially hotter portion of contact material, whereby conversion of the condensate is effected at a substantially higher temperature and pressures than those in said separation and condensing zones, withdrawing vapor conversion products and used contact material from said conversion zone and passing the contact material through a reconditioning zone wherein its temperature level is increased, mixing a portion of the reconditioned contact material with the cool contact material from said condensing zone as aforesaid, cooling a portion of said reconditioned contact material and passing it to said condensing zone as aforesaid.

11. A method for catalytic conversion of non-asphaltic constituents in asphalt-bearing feeds to lower-boiling hydrocarbon products, which comprises effecting partial vaporization of the feed by heating to a temperature below which cracking and coking thereof occurs, effecting separation of the vaporized portion from the non-vaporized, asphalt-containing portion in a confined phase separation zone under a pressure in excess of that desired for catalytic conversion, passing the vaporized portion into contact with finely-divided catalyst in a confined conversion zone maintained at a superatmospheric conversion pressure which is below that in the phase separation zone, and at a temperature suitable for effecting said conversion; subjecting the non-vaporized fraction to vacuum distillation to divide said fraction into a vacuum distillate and a heavy residual liquid, passing a finely-divided porous catalyst downwardly through a barometric condensation zone, said catalyst being supplied to said condensing zone at a temperature substantially below the condensation temperature of said vacuum distillate, passing the vacuum distillate vapors into said barometric condensation zone, to effect condensation thereof and sorption of the distillate vapors upon said catalyst, whereby a vacuum is created in said barometric condensation zone, withdrawing the contact material bearing the sorbed vapors from the lower section of the barometric condensation zone as an elongated gravity drain leg, said leg being of sufficient length to force contact material flow by gravity from said condensing zone to a higher pressure region at the lower end of said leg and said leg being of such restricted cross-section as to limit gas flow through said leg into said condensation zone to a small fraction of the amount of said vapors entering said zone from said vacuum tower, and passing the catalyst with the vacuum distillate sorbed thereon through said conversion zone, in admixture with the vapors from the phase separation zone and with additional hot catalyst in an amount sufficient to sustain conversion temperatures.

12. In a process for the conversion of higher-boiling petroleum fractions to lower-boiling products in the presence of finely-divided contact materials, the improved method of handling a higher-boiling petroleum feed, which comprises heating said feed to a temperature suitable for effecting partial vaporization thereof but below a coking and cracking temperature, passing the mixture to a confined phase separation zone maintained above the desired conversion pressure to effect separation of the vaporized material from the non-vaporized fraction, passing the vaporized fraction without intermediate condensation and compression thereof to a conversion zone maintained at a superatmospheric conversion pressure, passing the non-vaporized fraction to a vacuum distillation zone to effect fractionation of further vaporizable distillate material from a non-vaporizable liquid residue, at a temperature below the coking and cracking temperature and under reduced pressures substantially below that in said conversion zone, passing a finely-divided contact material downwardly through a barometric condensation zone, passing the distillate vapors from said vacuum distillation zone into said barometric condensation zone, said contact material being supplied to said condensing zone at a temperature substantially below the condensation temperature of the vacuum distillate vapors, condensing said distillate vapors and depositing them on said cool contact material, whereby a vacuum is created in said barometric condensation zone, withdrawing the contact material bearing the sorbed vapors from the lower section of the barometric condensation zone as an elongated gravity drain leg, said leg being of sufficient length to force contact material flow by gravity from said condensing zone to a higher pressure region at the lower end of said leg, passing said contact material bearing the vacuum distillate into said conversion zone, and mixing it therein with the vaporized material from the phase separation zone, while supplying heat to the contact material to heat it to a temperature at which the mixed hydrocarbons are converted.

13. A method for the conversion in the presence of a powdered adsorbent catalyst of high boiling hydrocarbon charges containing constituents which decompose when heated to temperatures required to effect the vaporization thereof at the desired conversion pressure, which comprises, heating a high-boiling hydrocarbon charge stock to a temperature sufficient to vaporize a portion thereof but insufficient to cause substantial cracking or coking thereof, passing the thus-heated charge stock into a phase separation zone, separating a vaporized portion therefrom, and admixing the vaporized portion with a powdered catalyst existing substantially above the desired average conversion temperature to effect suspension thereof and passing the mixture as a first feed stream into a conversion zone operated at a superatmospheric conversion pressure, withdrawing the non-vaporized portion of the charge from said phase separation zone and injecting it into a vacuum distillation zone in which it is subjected to vacuum distillation to provide a substantially asphalt free vacuum distillate and viscous non-vaporized fraction, introducing a finely-divided adsorbent cracking catalyst into a confined condensing zone at a temperature substantially below a cracking temperature and below the condensation temperature of said vacuum distillate, passing the vacuum distillate vapors into said barometric condensation zone, to effect condensation and sorption thereof upon said catalyst, whereby a vacuum is created in said barometric condensation zone, withdrawing the catalyst bearing the sorbed vapors from the lower section of the barometric condensation zone as an elongated gravity drain leg, said leg being of sufficient length to force contact material flow by gravity from said condensing zone to a higher pressure region at the lower end of said leg, passing the catalyst with the vacuum distillate sorbed thereon, in a suspended condition into said conversion zone, and admixing it therein with sufficient of said first feed stream to provide the proper average conversion temperature.

14. A method for catalytic cracking conversion of high boiling liquid hydrocarbon charges containing constituents which undergo pyrolytic cracking and coking at temperatures required to vaporize the same under pressures desirable for catalytic cracking conversion thereof which method comprises, heating the hydrocarbon charge stock to a temperature sufficient to vaporize a portion thereof but insufficient to cause substantial cracking or coking thereof, passing the heated charge into a phase separation zone maintained at a pressure substantially above the desired catalytic conversion pressure and effecting separation of vaporized and non-vaporized fractions of the charge, passing the non-vaporized fraction to a distillation zone maintained under a vacuum so as to effect further vaporization to provide a vacuum distillate vapor stream and a heavy liquid fraction, withdrawing the liquid fraction from the operation, supplying a cracking catalyst in palpable particulate form at a temperature substantially below the condensation temperature of said vacuum distillate into a confined condensing zone, passing the vacuum distillate through a communicating passage from the distillation zone to said condensing zone to become mixed with and condensed on said catalyst, whereby the vacuum is maintained in said distillation zone, flowing the catalyst bearing the condensed liquid hydrocarbons downwardly from said condensing zone as a substantially compact confined column of gravitating catalyst, said leg being of sufficient length to force the catalyst to flow from said condensing zone to a lift feed zone therebelow maintained at a pressure above that in said conversion zone, passing at least a portion of the vaporized fraction from said phase separation zone into said lift feed zone to suspend said catalyst and to carry it into the upper portion of a confined conversion zone, passing the catalyst downwardly through said conversion zone as a substantially compact column and supplying heat to said conversion zone to effect catalytic conversion of the vaporized and liquid hydrocarbons to lower boiling products.

15. A method for catalytic cracking conversion of high boiling liquid hydrocarbon charges containing constituents which undergo pyrolytic cracking and coking at temperatures required to vaporize the same under pressures desirable for catalytic cracking conversion thereof which method comprises, effecting vaporization of at least a portion of said charge in a confined zone at a pressure substantially below the desired catalytic conversion pressure, passing the resulting hydrocarbon vapors to a confined condensing zone, supplying a catalyst in palpable particulate form to said condensing zone at a temperature substantially below the condensing temperature of said hydrocarbon vapors, effecting intimate mixing of the vapors and said catalyst so that the vapors are condensed and sorbed by the catalyst particles, passing the catalyst bearing sorbed hydrocarbon downwardly from said condensing zone as a compact gravitating column of sufficient length to insure catalyst flow to a higher pressure region below said condensing zone and transferring the catalyst from said higher pressure region to a confined conversion zone, flowing the catalyst downwardly through said conversion zone as a substantially compact column and supplying heat to raise its temperature to a level suitable for effecting catalytic conversion of the liquid hydrocarbons to lower boiling vapor products, passing used catalyst from the lower section of said conversion zone to and through a regeneration zone to effect removal of contaminant deposited on the catalyst by means of burning with an oxygen containing gas, and cooling at least a portion of the regenerated catalyst and supplying it to said condensing zone as aforesaid.

16. A method for catalytic cracking conversion of high boiling liquid hydrocarbon charges containing constituents which undergo pyrolytic cracking and coking at temperatures required to vaporize the same under pressures desirable for catalytic cracking conversion thereof which method comprises, heating the hydrocarbon charge stock to a temperature sufficient to vaporize a portion thereof but insufficient to cause substantial cracking or coking thereof, passing the heated charge into a phase separation zone maintained at a pressure substantially above the desired catalytic conversion pressure and effecting separation of vaporized and non-vaporized fractions of the charge, passing the vaporized fraction into a conversion zone containing a downwardly-moving, substantially compact bed of contact material of palpable particulate form, passing the liquid fraction into a vacuum distillation zone, whereby it is separated into a liquid asphalt containing fraction and a vacuum distillate fraction, withdrawing the last named liquid fraction from the operation, passing the vacuum distillate to a confined condensing zone, supplying a cracking catalyst of palpable particulate form to said condensing zone at a temperature substantially below the condensation temperature of the vacuum distillate fraction, condensing and sorbing said distillate vapors on the catalyst, whereby a vacuum is created in said barometric condensation zone, withdrawing the catalyst bearing the sorbed vapors from the lower section of the barometric condensation zone as an elongated gravity drain leg, said leg being of sufficient length to force contact material flow by gravity from said condensing zone to a higher pressure region at the lower end of said leg and said leg being of such restricted cross-section as to limit gas flow through said leg into said condensation zone to a small fraction of the amount of said vapors entering said zone from said vacuum tower, transferring the contact material with the vacuum distillate sorbed thereon from said higher pressure region into the upper region of said conversion zone, mixing it with sufficient hot contact material to attain conversion temperatures, and passing the mixture downwardly through the conversion zone as a substantially compact bed of contact material to effect cracking conversion of said hydrocarbon charge to a lower boiling vapor product.

17. A method for catalytic cracking conversion of high boiling liquid hydrocarbon charges containing constituents which undergo pyrolytic cracking and coking at temperatures required to vaporize the same under pressures desirable for catalytic cracking conversion thereof which method comprises, heating the higher-boiling hydrocarbon liquid charge stock to a temperature varying between about 700° F. and about 900° F., passing it into a phase separation zone operated at temperatures varying between about 600° F. and about 900° F. and under pressures of between about 10 and about 30 pounds per square inch gauge, separating a gaseous portion therefrom and passing it into a catalytic cracking conversion zone, separating a liquid portion and passing it into a vacuum distillation zone maintained at temperatures varying between about 600° F. and about 850° F. under pressures of between about one and about ten pounds per square inch absolute, whereby said liquid portion is divided into a liquid residue and a vaporized vacuum distillate, supplying a finely-divided cracking catalyst at a temperature below the condensation temperature of said distillate and within the range about 200–600° F. into a barometric condensation zone, passing said distillate vapors into said barometric condensation zone to effect condensation and sorption thereof on the cool catalyst, whereby a vacuum is created in said barometric condensation zone and maintained in said distillation zone, withdrawing the catalyst bearing the sorbed vapors from the lower section of the barometric condensation zone as an elongated gravity drain leg, said leg being of sufficient length to force catalyst flow by gravity from said condensing zone to a higher pressure region at the lower end of said leg and said leg being of such restricted cross-section as to limit gas flow through said leg into said condensation zone to a small fraction of the amount of said vapors entering said zone from said vacuum tower, passing the catalyst with the vacuum distillate sorbed thereon into said conversion zone, and mixing it with sufficient hot catalyst to attain conversion temperatures.

References Cited in the file of this patent
UNITED STATES PATENTS

| | | |
|---|---|---|
| 56,852 | Ewing | July 31, 1866 |
| 2,376,190 | Roetheli et al. | May 15, 1945 |
| 2,382,755 | Tyson | Aug. 14, 1945 |
| 2,546,625 | Bergstrom | Mar. 27, 1951 |
| 2,560,899 | Shand | July 17, 1951 |
| 2,570,607 | Smith | Oct. 9, 1951 |
| 2,641,573 | Weikart | June 9, 1953 |
| 2,666,731 | Bergstrom | Jan. 19, 1954 |

UNITED STATES PATENT OFFICE
CERTIFICATE OF CORRECTION

Patent No. 2,859,171                                                      November 4, 1958

Frank C. Fahnestock et al.

It is hereby certified that error appears in the printed specification of the above numbered patent requiring correction and that the said Letters Patent should read as corrected below.

Column 2, line 54, for the patent number "2,592,404" read -- 2,779,717 --; column 10, line 43, for the patent number "2,779,717" read -- 2,592,404 --.

Signed and sealed this 10th day of February 1959.

(SEAL)

Attest:

KARL H. AXLINE
Attesting Officer

ROBERT C. WATSON
Commissioner of Patents